May 6, 1930.  W. F. SHELGREN  1,757,946
VANITY CASE
Filed Feb. 3, 1928
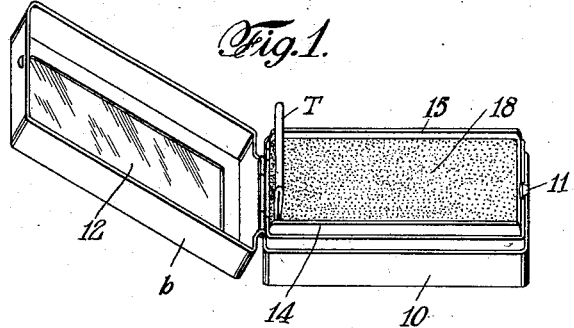
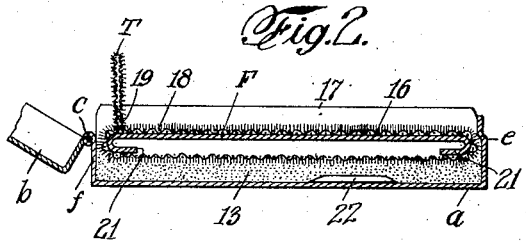
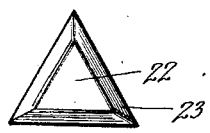
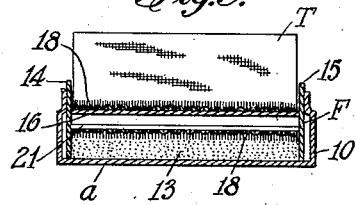
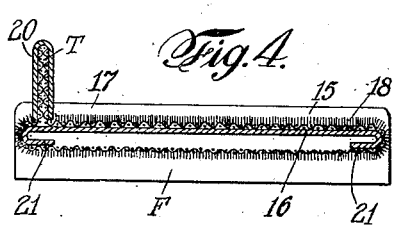
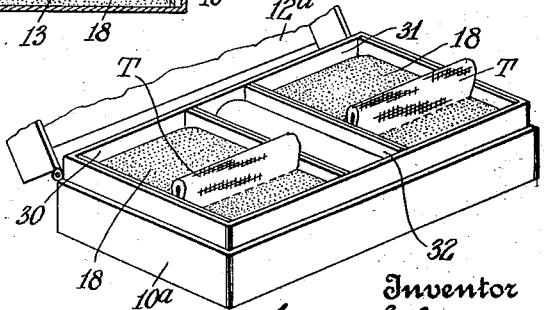
Inventor
Walter F. Shelgren
By his Attorney Patented May 6, 1930

1,757,946

UNITED STATES PATENT OFFICE

WALTER F. SHELGREN, OF BRADFORD, PENNSYLVANIA

VANITY CASE

Application filed February 3, 1928. Serial No. 251,601.

The present invention is a powder container of the type known as vanity cases generally used by women and carried about in the hand, pocketbook or in a similar manner.

It is desired by some persons to use loose powder, in contradistinction to powder in compact or cake form but a satisfactory container of the above type has not been devised, so far as it is known, which will properly retain the powder therein and while being capable of supplying only a small quantity of powder to be taken up by puff, chamois or other applicator.

It is the object, therefore, of this invention to provide a vanity case in which there is no danger of spilling the supply of powder, and in which a small quantity of the powder from the supply is evenly spread over surfaces adapted to be alternately exposed and concealed, when the case is open, yet which is economical to manufacture.

Another object of the invention is the provision of an oscillatory carrier or spreader having portions alternately extending into the powder chamber, thus preventing undue accumulation of the powder in any one end of the container, said spreader being so arranged and constructed as to form a tight seal between the powder supply and the exterior of the case, thus preventing the powder from being spilled or shaken from the powder chamber or reservoir and excessive amounts of the powder from being carried on the exposed surfaces of the carrier.

Another object of the invention is the provision of a free floating agitator in a powder container preventing loose powder from caking on the bottom or lodging in the corners of the container and which will keep the powder in a loosened state during atmospheric changes; and, it is also the object of the invention to provide said agitator of such construction as will throw the powder, during ordinary handling of the container, upon a powder carrier or spreader disposed within the powder chamber, when the powder content in the chamber is low.

Other objects and features of the invention will appear in the following detailed description setting forth the construction, combination and arrangement of parts and will be particularly pointed out in the appended claims.

In the drawings which show the embodiments of the invention—

Figure 1 is a perspective view of the powder container constructed in accordance with the present invention.

Figure 2 is a longitudinal sectional view taken through the reservoir chamber of the container and showing the construction of the powder supply or spreading device.

Figure 3 is a transverse sectional view.

Figure 4 is a view of the supporting frame for the powder conveyor removed from the container.

Figure 5 is a perspective view of a modified form of vanity case constructed in accordance with the present invention, and Figure 6 is a plan view of the agitator.

The invention is shown as applied in connection with a rectangular container. However, it is to be understood that the invention is applicable to various types of containers and is susceptible to various modifications in order to permit its adaptation thereto.

Referring in detail to the drawings the numeral 10 denotes a container of box-like construction having a bottom $a$, and a top $b$, hinged together at $c$, and adapted to be fitted together in the usual manner and releasably secured by a suitable latch 11. For convenience a mirror 12 is provided on the underside of the cover $b$. The bottom $a$ of the container forms the powder reservoir or chamber in which a desired quantity of loose powder 13 may be placed.

In order to maintain the powder in the reservoir against spilling when the container is opened and to present only the desired quantity of the powder for use, a removable closure is provided for the reservoir consisting of a frame having spaced parallel side walls 14 and 15 connected together by a plate 16 extending longitudinally of the walls 14 and 15 and having its edges secured thereto at a point near the upper side edge 17 of the side walls. The removable frame F is of a size and dimension to fit tightly within the reservoir $a$, of the container 10, preferably so that the side walls 14 and 15 of the frame will lie in a close relation with the corresponding side walls of the reservoir a, and the end edges of the walls 14 and 15 of the frame abutting the corresponding side walls of the reservoir.

A strip of fabric 18, preferably velvet or the like, is placed around the plate 16 to form an endless belt and is tightened sufficiently so that the belt will remain constantly taut. This can be accomplished by stitching the free ends of the strip of fabric, as at 19, or fastening them together by any suitable means such as a metallic clip 20 shown in Figure 4. These ends of the strip 18 form a tab T, which may be readily grasped and reciprocated from one end of the container to the other. As will be observed each reciprocating movement of the tab T will alternately move one portion of the surface of the belt into the powder container bearing a quantity of powder spread thereover which may be readily taken up by a suitable applicator for the usual purposes. Another function which the tab T serves is that of limiting the alternating shifting movement of the belt. When the tab has been moved from one end of the plate 16 to the other end, the portion of the belt which has previously delivered powder and which is on the upper surface of the plate is moved into the reservoir a and the portion of the belt which was previously within the reservoir has been brought to lie exteriorly of the plate with a supply of powder thereon. The movement of the tab from end to end of the plate 16 is the limit of the supplying capacity of the belt with one operation. If the user does not wish a full supply of powder, the tab may be moved at any intermediate position to deliver the desired amount of powder, the user having become familiar with the quantity of powder supplied at various positions of the tab through use of the device. The tab T also serves as a pull-tab whereby the closure or frame F may be removed from the container to permit cleaning or the replenishment of powder in the reservoir a.

In order to insure smooth operation and movement of the belt 18 the ends 21 of the plate 16 are bent downwardly upon themselves to form a rolled edge over which the belt passes. These rolled ends 21 are spaced, from the end walls e and f of the container. a distance less the thickness of the fabric 18 whereby the fabric will contact the walls e and f of the container and serve to prevent the powder from the reservoir from spilling or shaking out, it being understood that a pile and nap-like fabric such as velvet is preferably used.

The longitudinal edges of the plate 16 may be secured to the walls 14 and 15 of the frame in any suitable manner such as by soldering or the like. As the contents within the reservoir diminish, shaking of the case 10 which it receives in ordinary handling is sufficient to insure the desired quantity of the powder to adhere to the surface of the belt 18 so that it will be delivered on the upper side of the frame, when the tab T is next shifted.

To more effectively insure a supply of powder to the belt or carrier 18, a floating agitator 22 is disposed within the powder chamber or reservoir and will move or shift therein as a result of the ordinary handling of the container. This agitator may be of any desired shape or construction which will break up any powder caked or lodged in the corners of the powder chamber or caked on the bottom, and which would tend to throw, spray or otherwise apply powder to the surface of the belt 18 lying within the powder chamber, when the powder content therein is low. It has been found that a triangular piece of material, such as a metal slug 22 having opposite flat surfaces with the edge of its upper face beveled, as at 23, satisfactorily accomplishes the purposes sought, because the beveled edge acts as a scraper and also throws a spray of powder on the under side of the belt 18, when agitator is moved or shifted. The triangular shape of the agitator permits its pointed ends to readily reach the corners of an angular container, such as shown in the drawing, and keep the powder in a loosened state during atmospheric changes; also, the agitator striking the side walls of the powder chamber will produce a sound that will indicate the condition of the powder contents therein.

In Figure 5, there is shown a modified form of the invention which consists of a double vanity case having a powder chamber 30 and a rouge chamber 31 and an intermediate compartment 32 for lipstick, hair-pins and the like. Compartments 30 and 31 are equipped with powder conveyors similar to that described above and, therefore, the same reference characters will be applied to the conveyor frame and belt, as above. In the container 31, it is to be understood, of course, that loose rouge is used.

The container 10 is designed to have sufficient clearance from the mirror 12 to permit an applicator to lie therebetween when the cover b is closed.

It will thus be seen that a very simple and economical loose powder container has been provided which employs conveyor belt having an operating tab by which the same can be conveniently oscillated to move portions of the belt alternately in to the powder retainer chamber and which by reason of its construction will prevent the powder from spilling or shaking from the container. One of the features of the device which should be noted is the simplicity of its construction and attention should also be called to the fact that applicant's conveyor belt is at all times taut, insuring an even supply and spread of the powder over the belt and further insuring against leakage or a spilling of the reservoir.

What is claimed is:

1. A powder holder of the kind described comprising a powder containing chamber, an endless powder belt arranged over said chamber and held constantly taut and in engagement with the end walls of the chamber to close the latter, and a finger piece on said belt for reciprocating the same.

2. A powder holder of the kind described comprising a powder reservoir, means for closing said reservoir including a removable plate, an endless belt extending around top and under surfaces of said plate and a tab on one reach of the belt whereby the belt may be shifted relative to the plate, or the plate may be removed from the container.

3. A powder holder of the kind described comprising a powder reservoir, means for closing said reservoir including a frame having side walls to fit into the reservoir and connected by a plate, an endless belt extending around said plate between said side walls and spaced from the bottom of the reservoir, an outwardly projecting tab on said belt whereby the same may be shifted in opposite direction.

4. A powder case of the kind described comprising a container having a powder reservoir, a plate closing the reservoir and slightly spaced at its ends from the side walls of the container, an endless band of flexible material having a nap-like outer surface slidably extending around opposite surfaces of said plate and around the ends of said plate, the nap-like portions of said band filling the spaces between the ends of said plate and the side walls of said container and serving to seal the reservoir against the leakage of powder therefrom.

5. A powder holder of the kind described comprising a powder chamber, means for closing said reservoir including a frame having side walls connected by a plate extending longitudinally of said walls, an endless belt extending around said plate, the ends of said plate being folded upon themselves to form smooth edges and spaced sufficiently from the end walls of said chamber to cause the surface of said fabric in contact with said end walls to prevent the leakage of powder from the chamber.

6. A powder case of the kind described comprising a container having a chamber and a lid for the container, said container being provided with a powder reservoir, a top plate normally closing said reservoir, an endless belt extending around outer and inner surfaces of said top plate, said plate being rigid for providing an unyielding support for the belt and arranged to maintain the belt spaced from the bottom of the chamber for providing a substantial powder containing space thereunder, and a finger piece on the belt arranged exteriorly of the chamber whereby the belt may be shifted in opposite directions by the finger piece.

7. A powder case of the kind described comprising a container having a chamber and a top for the container, a closure for said chamber, an endless belt enclosing outer and inner surfaces of said closure, said closure being rigid for providing an unyielding support for the belt, and arranged to maintain the belt spaced from the bottom of the chamber for providing a powder containing space of substantial depth under the belt, and a finger piece on the belt arranged exteriorly of the chamber whereby the belt may be shifted in opposite directions.

8. A powder case of the kind described comprising a container having a powder reservoir, a flat plate overlying the reservoir and substantially spaced from the bottom thereof, an endless band stretched around upper and lower surfaces of the plate and constantly taut thereon, and a finger piece on the band and positioned exteriorly of the reservoir by which portions of the band on opposite sides of the finger piece may be alternately shifted into and out of the reservoir and acting as an indicator to denote the degree of movement of the band.

9. In a powder container having a powder reservoir, a strip of cloth arranged to normally overlie the reservoir with one stretch thereof extending into the reservoir and the end portions thereof lying exteriorly of the reservoir, means for supporting said cloth, and a clip member of substantially rigid material disposed exteriorly of said reservoir and securing the ends of said cloth together to provide an endless belt and forming a finger piece by which the belt may be reciprocated.

10. In a vanity case having a powder container, a powder conveyor movably arranged in the container and being capable of carrying powder from the container to a point where it may be removed from the conveyor, said conveyor comprising an endless belt of flexible material of a character to which powder in the container will adhere, and a finger-piece on the endless conveyor and disposed exteriorly of the reservoir, said finger-piece being engageable for shifting the belt in opposite directions to predetermined extents.

11. In a vanity case having a powder container, an endless powder conveyor movably arranged in the container and being capable of carrying powder from the container to a point where it may be removed from the conveyor, said conveyor comprising a strip of flexible material and fastening means securing the ends of the strip together exteriorly of the reservoir, said fastening means providing a finger portion to be engaged by the user whereby the belt may be shifted in opposite directions.

12. A powder case of the kind described comprising a container having a powder chamber, a closure for the chamber including a substantially flat plate portion having its inner face spaced a substantial distance from the bottom of the chamber, a shiftable belt extending around said flat portion of the closure with the reaches thereof lying parallel and adjacent the opposite faces of said plate, respectively, whereby one face of the belt is exterior of the chamber and the other face extends into the chamber and the bottom reach of the belt is maintained spaced from the bottom of the chamber for providing a substantial powder containing space under the belt.

In testimony whereof I have hereunto set my hand.

WALTER F. SHELGREN.